United States Patent [19]
Ito

[11] 3,944,726
[45] Mar. 16, 1976

[54] APPARATUS FOR MAKING PRINTING MASTERS

[75] Inventor: Shuji Ito, Takarazuka, Japan

[73] Assignees: Mitsubishi Denki Kabushiki Kaisha; Dainippon Ink & Chemicals, Incorporated; Yoshio Murata, all of Tokyo, Japan

[22] Filed: Feb. 12, 1974

[21] Appl. No.: 441,799

[30] Foreign Application Priority Data
Feb. 21, 1973 Japan.............................. 48-20977
Feb. 20, 1973 Japan.............................. 48-20352
Feb. 19, 1973 Japan.............................. 48-19957

[52] U.S. Cl..................... 178/6; 358/78; 178/6.7 R
[51] Int. Cl.²........................................... H04N 1/38
[58] Field of Search ....... 178/6, 6.6 R, 6.7 R, 6.6 B; 358/77, 80, 78, 75

[56] References Cited
UNITED STATES PATENTS
3,272,918 9/1966 Koll .................................. 178/6.6 A
3,613,103 10/1971 Harris ............................... 178/6.6 R
3,723,646 3/1973 Behane .............................. 178/6.6 R
3,760,098 9/1973 de Vos............................... 178/6.6 R

*Primary Examiner*—Howard W. Britton
*Assistant Examiner*—Michael A. Masinick
*Attorney, Agent, or Firm*—Oblon, Fisher, Spivak, McClelland & Maier

[57] ABSTRACT

A printing master making apparatus is disclosed. The apparatus comprises a first rotary cylinder on which an original is wound, a second rotary cylinder on which a recording object is installed, a detecting system, and a reproducing system. The two cylinders are synchronous with each other when rotated. The necessary color light from the original is detected in terms of an electric signal by the detecting system. The detected signal is then expanded or contracted by a given length of time, and/or the time axis of the detected signal is converted. The recording object is caused to undergo an excitation by the reproducing system according to the expanded or contracted signal and thus the margin of dye blur or the margin of pattern overlap is adjusted, and at least the rotary cylinder is enlarged or compressed in its circumferential direction.

13 Claims, 8 Drawing Figures

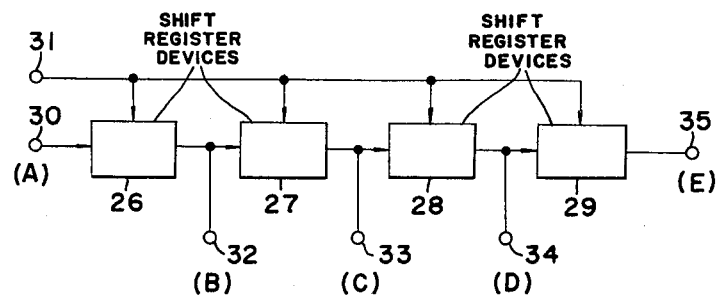
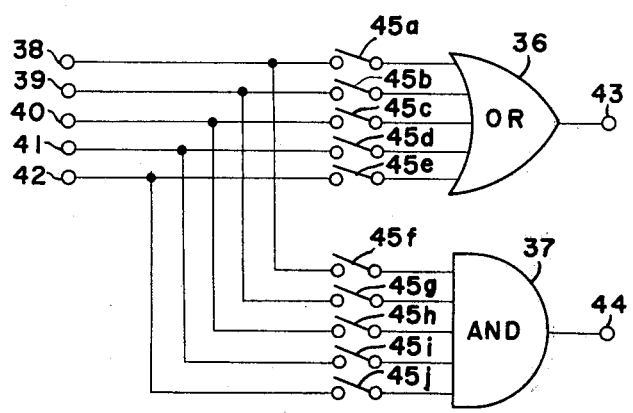
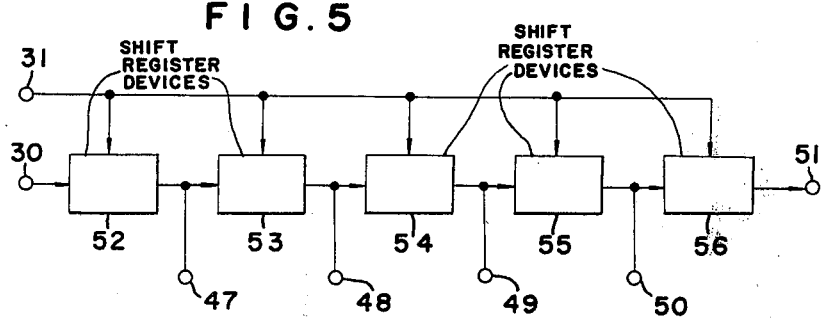

APPARATUS FOR MAKING PRINTING MASTERS

BACKGROUND OF THE INVENTION

1. Field of the Invention

The present invention relates to apparatus for making printing masters used, for example, in general printing and textile printing.

2. Description of the Prior Art

In natural color and multi-color photographic printing and plate-making, it is the general practice that an original pattern is decomposed into three print patterns in three primary colors or into four print patterns including a monochromatic pattern in addition to the three primary color patterns. The desired color tone is reproduced by superimposedly printing these patterns on an object. In textile printing, there have been difficulties in reproducing the desired color tone by simply superimposing a set of print patterns on an object cloth, chiefly due to the dye or pigment used. This has made it impossible to use the three primary colors. Hence, in multi-color printing for a pattern comprising, for example, five colors, the provision of five printing masters, constructed by decomposing an original pattern, has been indispensable.

Recently, the decomposition of an original tone has been achieved by a mechanical process using a color decomposing apparatus, which normally comprises more than three photoelectric systems depending upon the number of colors to be detected for color tone decomposition. FIG. 1 schematically illustrates an example of a conventional color decomposing apparatus (with only one photoelectric system shown for explanatory simplicity).

Referring to FIG. 1, the numeral 1 denotes a first rotary cylinder on which a pattern original 2 is wound. The numeral 3 denotes a second rotary cylinder which is synchronous with the cylinder 1 when rotated and on which a recording object 4 such as a photosensitive film or a photosensitive copper plate is wound. The numeral 5 denotes an illumination lamp and 6 a projection lens for converging the light from the lamp 5 and thus illuminating a given point on the original 2. The numeral 7 denotes an optical system for detecting color components from the light reflected from the original 2, and 8 is a photoelectric transducer element, such as a phototransistor and a photoelectric electron - multiplier tube, for transducing the decomposed light into an electric signal. The numeral 100 stands for a detecting system which comprises the illumination lamp 5, the projection lens 6, the optical system 7, and the photoelectric transducer element 8. The numeral 9 denotes an amplifier, 10 a wave shaping circuit, 11 a drive amplifier, 12 a crater tube, such as an electro-optic transducer element for producing light in response to an input signal given, and 13 is a lens for converging the light from the electro-optic transducer element 12. The numeral 101 stands for a reproducing system which comprises the electro-optic transducer element 12, and the lens 13. The detecting system 100 and the reproducing system 101 are moved by a drive device (not shown) in the rotating axial direction of the rotary cylinders 1 and 3, to thereby make auxiliary scanning on the pattern original 2 and on the recording object 4.

The conventional apparatus of FIG. 1 operates in the following manner. The original 2 which is wound on the rotary cylinder 1 is illuminated with the lamp 5 by way of the projection lens 6. The light reflected from the original 2 is led to the optical system 7 and decomposed into color light components. The decomposed light is transduced into an electrical signal by the photoelectric transducer element 8. The electric signal detected by the detecting device 100 is then amplified by the amplifier 9 shaped by the shaping circuit 10, and then supplied through the drive amplifier 11 to the reproducing device 101 in which the electric signal is transduced into light by the electro-optic transducer element 12. The light is then converged through the lens 13, and applied to the recording object 4 on the rotary cylinder 3. The rotary cylinders 1 and 3 are rotated in the arrow-marked direction by a motor (not shown) to cause the detecting device 100 and the reproducing device 101 to perform main scanning. Also, the detecting device 100 and the reproducing device 101 are moved by a drive device (not shown) in the rotating axial direction of the cylinders 1 and 3 to cause the devices 100 and 101 to perform auxiliary scanning. Consequently, the entire surface of the pattern original 2 is scanned whereby a printing master is formed.

In textile printing, it is to be taken into consideration that the printing object is a cloth which is more or less elastic, and the degree of dye blurring over the cloth varies according to the kind of cloth, the thickening agent used, and the printing method or process employed. To obtain an accurate print reproduction, therefore, the pattern of the master is made smaller than that of the original by an amount of estimated dye blurring (or a "bleed allowance"), or is made slightly larger than that of the original by an amount of pattern overlap (or an "overlap allowance") thereby preventing the boundary between patterns on the cloth from being left undyed. In practical printing, however, while somewhat satisfactory, the conventional color-decomposing apparatus has been far from perfect in making printing masters accurately without depending on human skill.

In roller printing, it should be understood that the size of the printing master should be changed according to the diameter of the engraved roll used in order to realize the complete repeat printing of an original. For this purpose, it is necessary to enlarge or compress the rotary cylinder only in its circumferential direction as shown in FIG. 1. Accordingly, the diameter of the rotary cylinder 1 should be different from that of the rotary cylinder 3. In practice, however, the rotary cylinders 1 and 3 are too heavy to be readily handled in order to change their sizes accurately. Thus, in the prior art conventional apparatus, an accurate printing master could not be realized without dependence upon a photographic process or human skill which would be used to adjust the blur margin or the overlap allowance. However, the use of a photographic process requires the use of films at an intermediate process which is time consuming and expensive. Moreover, the process of manually making the printing master is heavily dependent on the experience skill of a craftsman, which takes a good many years to attain. In addition, it takes this process a considerable length of time to produce a complete printing master, with the result that the production cost rises considerably.

SUMMARY OF THE INVENTION

Accordingly, it is an object of the present invention to provide a new and improved unique printing master making apparatus capable of adjusting a given blur margin or overlap allowance.

Another object of the present invention is to provide a new and improved unique printing master making apparatus capable of adjusting a given blur margin or overlap allowance and permitting expansion or contraction of such margin.

Briefly, in accordance with the present invention, the foregoing and other objects are in one aspect attained by the provision of a printing master making apparatus in which a first rotary cylinder on which an original is wound and a second rotary cylinder on which a recording object is installed are rotated synchronously with each other. The necessary color light from the original on the first rotary cylinder is detected in terms of an electric signal by a detecting system and the detected signal is expanded or contracted by a given length of time by an expanding/contracting circuit. The recording object installed on the second rotary cylinder is caused to undergo excitation by a reproducing system according to the output signal and thus the bleed allowance or the overlap allowance is adjusted.

BRIEF DESCRIPTION OF THE DRAWINGS

Other objects, features and advantages of the present invention will become apparent from the following description when taken in conjunction with the appended drawings, wherein:

FIGS. 3 and 5 are block diagrams showing by way of example the memory circuit shown in FIG. 2, FIG. 4 is a block diagram showing by way of example the expanding/contracting circuit shown in FIG. 2.

DETAILED DESCRIPTION OF THE PREFERRED EMBODIMENTS

Figure 1:
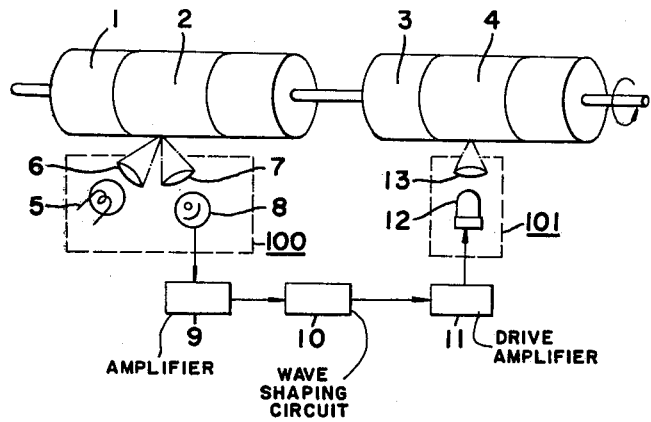
FIG. 1 is a schematic diagram showing the construction of a conventional color-decomposing apparatus.
Figure 2:
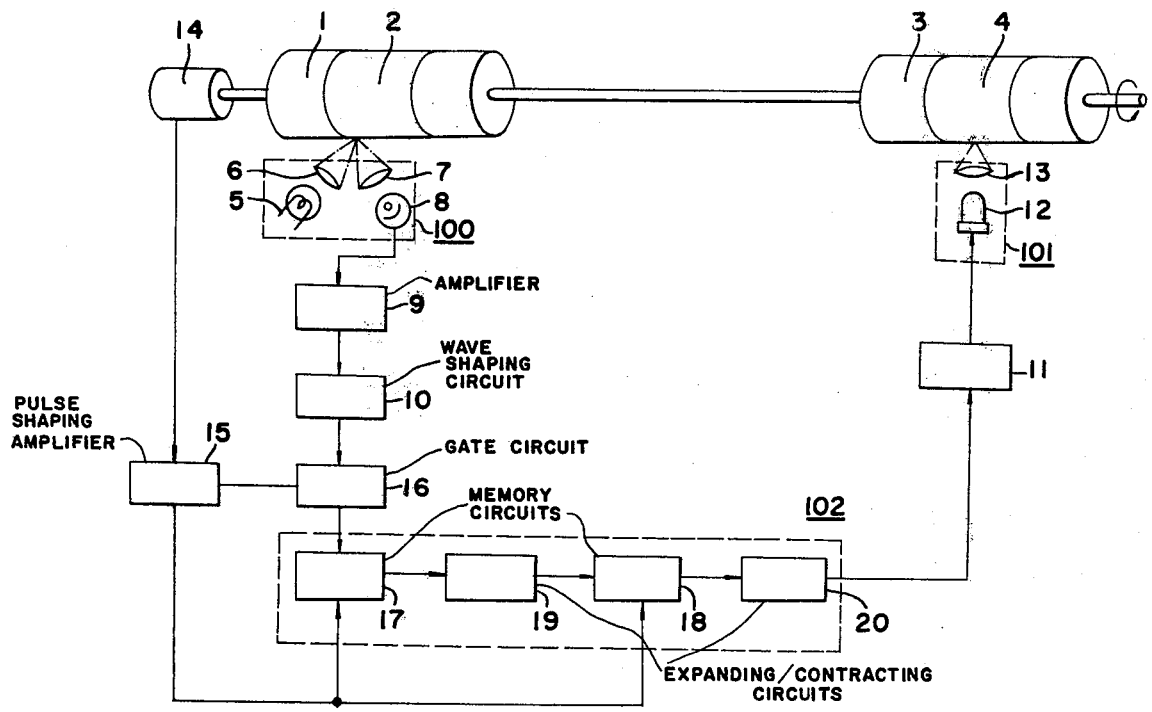
FIG. 2 is a schematic diagram showing the construction of a preferred apparatus embodying this invention.

Referring now to the drawings wherein like reference numerals refer to or designate identical or corresponding parts throughout the several views and more particularly to FIG. 2 thereof, wherein one preferred embodiment of the present invention is shown. Those like elements of FIG. 2 described with reference to FIG. 1 will not be repeated.

In FIG. 2, the numeral 14 represents a rotary encoder connected to the rotary cylinder 1. This encoder generates an N number of control pulses and one pulse of zero signal per rotation of the rotary cylinder 1. The numeral 15 denotes a pulse shaping amplifier for shaping the control pulse and the zero signal into $N \times 2^n$ pulses of clock signal and a pulse of zero signal. The numeral 16 denotes a gate circuit and the numeral 17 denotes a memory circuit of the main scanning direction (i.e., the rotating direction of the cylinders 1 and 2). The numeral 18 denotes a memory circuit of the auxiliary scanning direction (i.e., the direction in which the detecting system 100 and the reproducing system 101 are traversed). The numerals 19 and 20 denote an expanding/contracting circuit for determining the values of the bleed allowance and overlap allowance. The expanding/contracting circuit is capable of expanding or contracting the input signal by a given length of time and generates a corresponding output signal. The numeral 102 indicates a bleed allowance/overlap allowance adjusting circuit (hereinafter briefly referred to as the OL circuit) which comprises the memory circuits 17 and 18, and the expanding/contracting circuit 19 and 20.

The bleed allowance (or overlap allowance) is generally about 0.1 to 0.5 mm, depending on the kind of cloth of the printing object. Thus, when the diameter of the light spot of each of the detecting system 100 and the reproducing system 101 is determined to be 0.1 mm, a printing master having no blank areas can be obtained by applying 0.1 mm space auxiliary scanning. Hence, by taking this 0.1 mm space as a unit, i.e., one bit, the memory circuits 17 and 18 can be constituted of shift registers.

FIG. 3 schematically illustrates an example of the memory circuit 17 of the main scanning direction wherein the numerals 26 to 29 denote shift register devices each comprising a single or a plurality of shift registers. The numeral 30 denotes a signal input terminal, 31 a clock signal input terminal and 32 to 35 output terminals.

FIG. 4 shows in block form an example of the expanding/contracting circuit 19 and 20 wherein the numeral 36 denotes an OR circuit, 37 an AND circuit, 38 to 42 signal input terminals, 43 and 44 output terminals, and 45a to 45j width selection switches.

FIG. 5 shows in block form an example of the memory circuit 18 of the auxiliary scanning direction wherein 52 to 56 denote shift register devices each consisting of, for example, 4,000 shift registers when the circumference of the rotary cylinder 1 is 400 mm. (The number of shift registers is equal to the quotient resulting from the division of the circumference of the cylinder 1 by 0.1 mm.)

It should be understood that a static IC may be used for the shift register element. With the static IC, however, a large numer of IC's (i.e., 4000 IC's) are needed to constitute one shift register device if, for example, the bleed allowance (or overlap allowance) is 0.1 mm as described above. One solution to this problem is to use a package type MOS-LSI such as, for example, 1024 bits MOS-LSI shift register, Model 1404A, manufactured by INTEL, U.S.A. The shift register devices 53 and 54 can be obtained by the use of this MOS-LSI under the following condition.

$$\frac{L \ (mm)}{0.1 \ mm} = 1024 \times m = n \times 2^n \qquad (1)$$

where
- L: the length of the circumference of the rotary cylinder 1
- M: the number of INTEL 1404A MOS-LSI shift registers with 1024 bits per package
- N: the number of pulses of the output signal of the rotary encoder 14

Then, for example, when L = 409.6 mm, M = 4, N = 1024, and $n = 2$, one shift register device can be constituted of four MOS-LSI shift registers.

Figure 6:
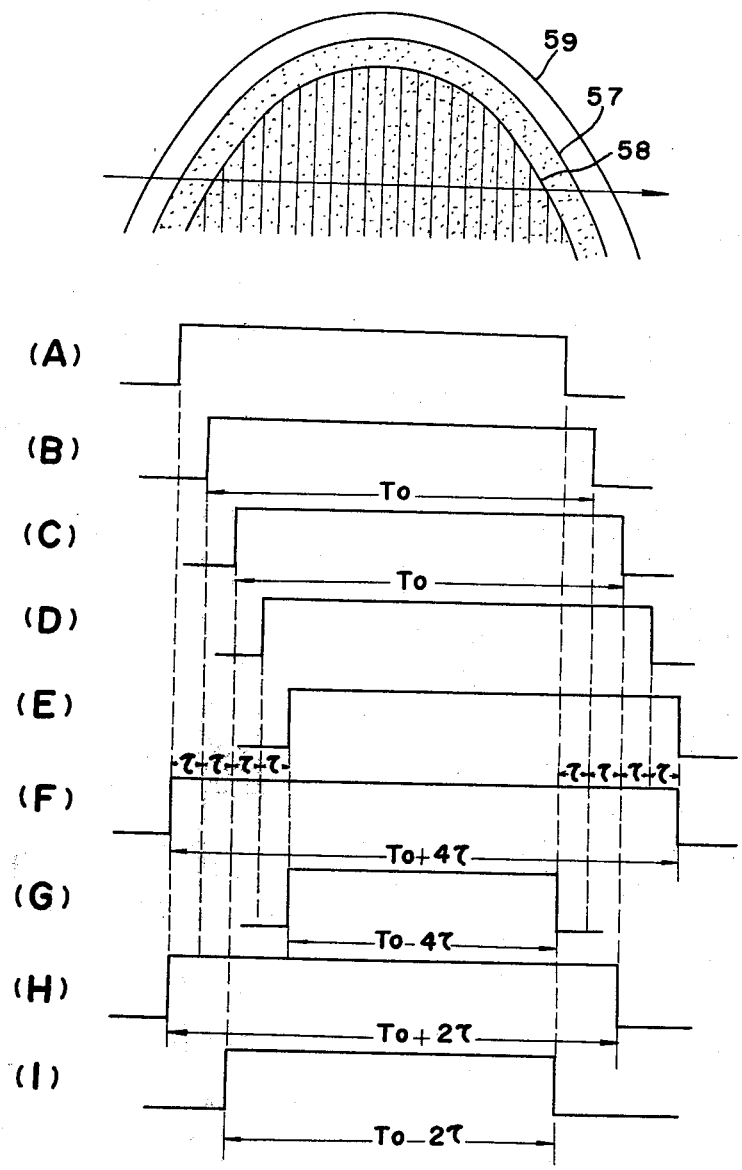
FIG. 6 is a diagram useful for illustrating the operation of a preferred embodiment of the present invention.

The operation for adjusting the bleed allowance in the main scanning direction will now be described below by referring to FIG. 6, in which the numeral 57 denotes a specific color pattern outline of an original wound on the rotary cylinder 1, and 58 denotes an outline after the adjustment of a bleed allowance. The space between the two outlines then represents the bleed allowance.

The numeral 59 indicates an outline after the adjustment of an overlap allowance, and the space between the two outlines 59 and 57 represents the overlap allowance. Assume that the light spot of the detecting system 100 scans the specific color pattern indicated by the outline 57, in the arrow-marked direction. The signal detected by the detecting system 100 during the scanning is amplified by the amplifier 9, shaped by the wave shaping circuit 10 into a signal A, which is supplied through the gate circuit 16 to the memory circuit 17 of the main scanning direction. This signal is then led to the shift register device 26 (FIG. 3) which is driven by the clock signal generated by the pulse shaping amplifier 15 at the time interval for which the detecting system 100 scans 0.1 mm. FIG. 6 shows a signal B which is delayed by $\tau$ behind the signal A and led to the output terminal 32 and to the shift register 27 in the next stage. This signal, with a delay by $\tau$, becomes a signal C which is led to the output terminal 33 and to the shift register device 28 in the next stage. In the same manner as above, a delayed signal D appears at the output terminal 34, and a delayed signal E at the output terminal 35. The signals B through E appearing at the output terminals 32 through 35, and the signal A applied to the input terminal 30 are supplied to the expanding/contracting circuit 19 in the next stage. In FIG. 4, the signal A goes to the input terminal 38, the signal B to the input terminal 39, and the signal C through E to input terminals 40 through 42 respectively. If width selection switches 45f, 45g and 45h are closed, the signals A,B and C enter the AND circuit 37 in which these signals are AND-gated to result in a signal I (FIG. 6) at the output terminal 44. When the signal B is taken as a reference signal, the signal I is smaller than the signal B by the time length $\tau$. In other words, the signal I is a signal which includes the adjustment of bleed allowance by 0.1 mm toward the inside of the outline 57 on the original pattern. If however, width selection switches 45a, 45b and 45c are closed, the signals A, B and C are led to the OR circuit 35 in which these signals are OR-gated to result in a signal H (FIG. 6) at the output terminal 43. This signal H is larger than the reference signal B by the time length $\tau$ as a whole. In other words, this signal H is a signal which includes the adjustment of overlap allowance by 0.1 mm toward the outside of the outline 57 on the original pattern. If the width selection switches 45a, 45b, 45c, 45d and 45e are closed, a signal F is obtained, which is larger than the signal C by a value of 0.2 mm for the adjustment of overlap allowance. If however, the width selection switches 45f, 45g, 45h, 45i and 45j are closed, a signal G is obtained, which is smaller than the signal C by a value of 0.2 mm for the adjustment of bleed allowance. In this manner, a signal including the adjustment of the necessary bleed allowance or overlap allowance can be obtained. The adjusted signal is led to the memory circuit 18 in the next stage, thence to the shift register device 52 (FIG. 5) which is driven by the clock signal from the pulse shaping amplifier 15. This signal is shifted from the shift register device 52 to the shift register devices 53, 54, 55 and 56 in succession. The outputs of the shift register devices 52 through 56 are then supplied to another expanding/contracting circuit 20 in the next stage through output terminals 47 to 51 respectively. In FIG. 4, one signal appearing at the input terminal 30 is supplied to the input terminal 38 the signal appearing at the output terminal 47, to the input terminal 39, and similarly the signals appearing at the output terminals 48 through 50, to input terminals 40 through 42 respectively. When a bleed allowance of 0.1 mm is desired in the auxiliary scanning direction as in the main scanning direction, then the width selection switches 45f, 45g and 45h are closed whereby the signals led to the input terminals 38, 39 and 40 are AND-gated by the AND circuit 37 to allow a 0.1 mm bleed allowance to be adjusted in the auxiliary scanning direction. Thus, a signal adjusted for the bleed allowance by 0.1 mm in both the auxiliary scanning direction and the main scanning direction is obtained at the output terminal 44. For the adjustment of overlap allowance, a signal adjusted for the necessary overlap allowance in the main scanning direction is applied to expanding-/contracting circuit 20 through the memory circuit 18. Then, by closing the width selection switches 45a, 45b and 45c (FIG. 4), the signals led to the input terminals 38 through 40 are OR-gated by the OR circuit 36 whereby 0.1 mm overlap allowance is adjusted in the auxiliary scanning direction, and a signal adjusted for the overlap allowance by 0.1 mm in the both scanning directions is obtained at the output terminal 43. If the width switches 45a, 45b, 45c, 45d and 45e are closed, an overlap allowance of 0.2 mm is adjusted. If, however, the width switches 45f, 45g, 45h, 45i and 45j are closed, a bleed allowance of 0.2 mm is adjusted. In this manner, the necessary bleed or overlap allowance can be adjusted.

The signal which has been adjusted for the necessary bleed allowance or overlap allowance by the OL circuit 102 is applied through the drive amplifier to the reproducing system 101, thereby exposing the recording object 4 installed on the rotary cylinder 3 and thus forming a printing master wherein adjustments are made for the bleed or overlap allowance and separate printing. By separate printing is meant that when a film original is wrapped on a roller, the pattern is adjusted at the connected part in order to make a normal shape across the connecting part.

Figure 7:
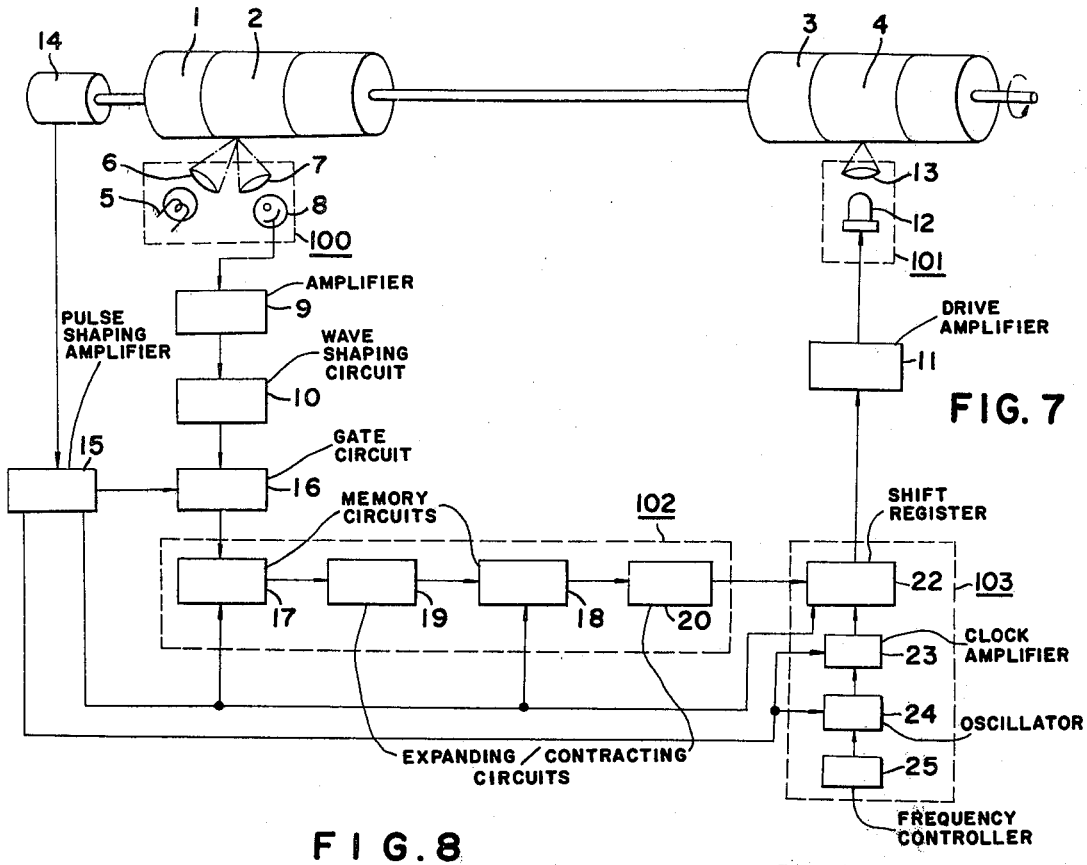
FIG. 7 is a schematic diagram showing a second alternative and preferred embodiment of the present invention.

Referring now to FIG. 7, there is schematically illustrated a second embodiment of the invention. It should be again noted that like references denote like components in FIGS. 1, 2 and 7, and therefore, no description is given for those components already described. In FIG. 7, the numeral 22 stands for a first-in-first-out type shift register (hereinafter briefly referred to as FIFO), which is a multistage shift register operable at different frequencies for write and read clocks. The numeral 23 denotes a clock amplifier, 24 an oscillator, and 25 a frequency controller for controlling the oscillation frequency of the oscillator 24 according to the ratio of expansion or contraction of a pattern original. The numeral 103 denotes an enlarging/compression circuit for the repeat printing (hereinafter designated briefly as RT circuit) which comprises the FIFO 22, the clock amplifier 23, the oscillator 24, and the frequency controller 25. The signal adjusted for a bleed or overlap allowance by the OL circuit 102 is registered into the FIFO 22 by the clock signal from the pulse shaping amplifier 15. The registered signal is amplified by the clock amplifier 23 and is then read at the time of the read clock signal from the oscillator 24. The oscillation frequency of this clock signal has been controlled by the frequency controller 25 according to the ratio of enlargement or compression, and the read start clock phase of the clock signal has been controlled by a 0 signal from the pulse shaping amplifier 25. For example, when the length of the pattern original 2 in the circumferential direction is 350 mm, and the circumference of the rotary cylinder 3 on which a recording object is installed is 400mm, an accurate repeat printing having no blanks can be obtained at the expansion ratio of 400/350. When the write clock frequency for the FIFO 22 is $f_o$, then the read clock frequency $f_1$ is given as $$f_1 = \frac{400}{350} f_o$$

For compression where the read frequency is higher than the write frequency ($f_1 > f_o$), then a shift register corresponding to one rotation of the rotary cylinder 1 should be inserted as a buffer between the FIFO 22 and the OL circuit 102.

The signal treated by the OL circuit 102 and the RT circuit 103 and adjusted for the desired bleed or overlap allowance and repeat printing (expansion or contraction), is applied through the drive amplifier 11 to the reproducing system 101 whereby the recording object 4 wound on the rotary cylinder 3 is exposed and thus a printing master for which the bleed or overlap allowance is adjusted and repeat printing is formed is provided.

In the above embodiment, the adjustment of bleed allowance in the main scanning direction is first made. However, it should be clear that the bleed allowance in the auxiliary scanning direction may instead be first adjusted. Also, an example wherein shift registers are used for the OL circuit has been described. However, here again it should be clear that other memory means, such as magnetic drums, magnetic tapes and magnetic disks, which are synchronous with the rotary cylinder may instead be used.

Moreover, while in the above embodiment, a reflection type detecting optical system is used as illustrated in the drawing, a transparent type detecting optical system may instead be used.

In the embodiment shown in FIG. 7, the RT circuit 103 is disposed after the OL circuit 102. As an alteration, the OL circuit 102 may be installed after the RT circuit 103.

Figure 8:
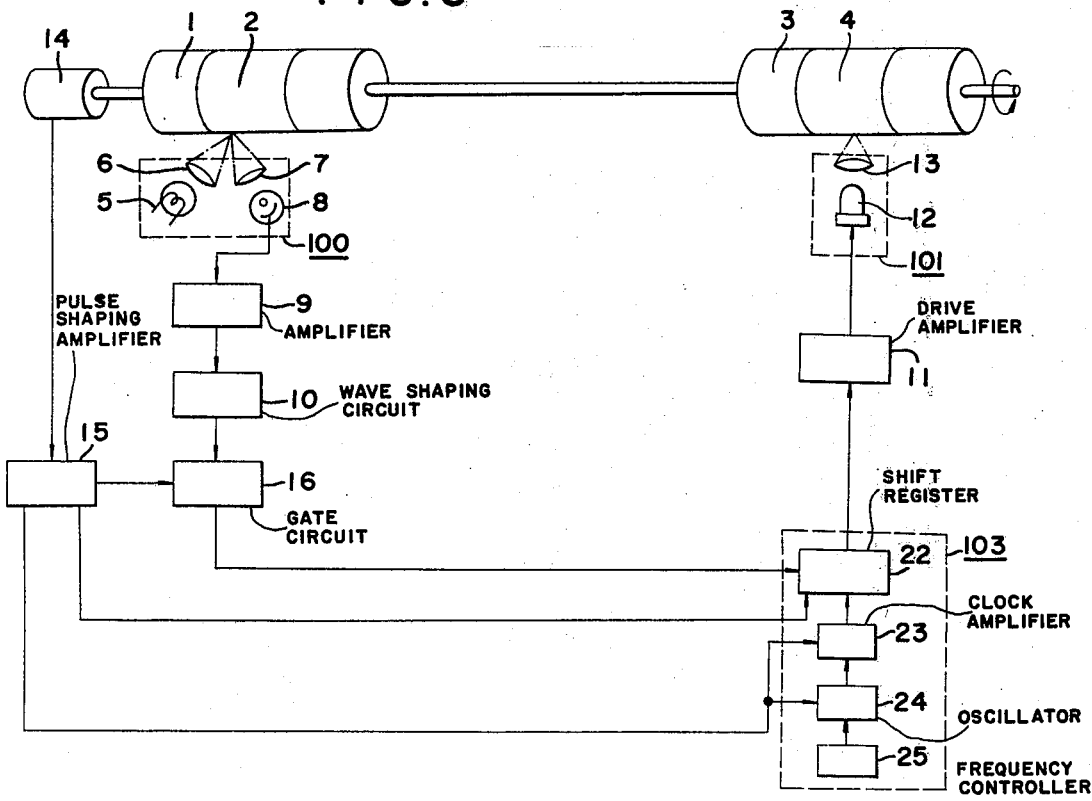
FIG. 8 is a schematic diagram showing a third alternative and preferred embodiment of the invention.

Referring now to FIG. 8, there is shown a third embodiment of the present invention wherein only the RT circuit 103 is used without the OL circuit 102. In this embodiment, the signal detected by the detecting system 100 is amplified by the amplifier 9 and shaped by the wave shaping circuit 10. This signal is supplied through the gate 16 to the RT circuit 103 wherein its time axis is converted. The resultant expanded or contracted signal is applied through the drive amplifier 11 to the reproducing system 101, to expose the recording object 4 wound on the rotary cylinder 3 whereby an expanded or contracted printing master is formed.

In the foregoing embodiments, the enlargement or compression of the rotary cylinder has been considered only in its circumferential direction. In addition to this circumferential enlargement or compression, a longitudinal and a lateral enlargement or compression of the rotary cylinder may be made when an arrangement capable of changing the feed speeds of the detecting system and the reproducing system are used in combination with the foregoing apparatus.

While a few preferred embodiments of the invention have been described, numerous variations thereto will occur to those skilled in the art within the scope of the present inventive concepts which are delineated by the following claims.

What is claimed as new and desired to be secured by Letters Patent of the United States is:

1. A textile printing master making apparatus comprising:
    a first and a second rotary cylinder to be rotated synchronously with each other;
    a detecting system for scanning a cloth original wound on the first rotary cylinder to detect the necessary color light in terms of an electric signal;
    a memory circuit for storing the detected electric signal;
    an expanding/contracting circuit for adjusting the bleed allowance or the overlap allowance capable of generating an output signal expanded or contracted by a given time length based on the input signal to the memory circuit; and,
    a reproducing system for exciting a recording object installed on the second rotary cylinder according to the output signal of the expanding/contracting circuit.

2. A textile printing master making apparatus in accordance with claim 1 wherein two systems of the memory circuit and the expanding/contracting circuit are provided, and output signals corresponding to the electric signal in the scanning direction of the detecting system and to the electric signal in the rotating direction of the rotary cylinder are supplied to the reproducing system.

3. A textile printing master making apparatus comprising:
    a first and a second rotary cylinder to be rotated synchronously with each other;
    a detecting system for scanning a cloth original wound on the first rotary cylinder to detect the necessary color light in terms of an electric signal;
    a memory circuit for storing the detected electric signal;
    an expanding/contracting circuit for adjusting the bleed allowance or the overlap allowance capable of generating an output signal expanded or contracted by a given time length based on the input signal to the memory circuit;
    an enlarging/compressing circuit for converting the time axis of the output signal of the expanding/contracting circuit to enlarge or compress the original in its circumferential direction; and
    a reproducing system for exciting a recording object installed on the second rotary cylinder according to the output signal of the enlarging/compressing circuit.

4. A textile printing master making apparatus in accordance with claim 3, wherein two systems of the memory circuit and the expanding/contracting circuit are provided, and wherein output signals corresponding to the electric signal in the scanning direction of the detecting system and to the electric signal in the rotating direction of the rotary cylinders are supplied to the enlarging/compressing circuit.

5. A textile printing master making apparatus comprising:

a first and a second rotary cylinder to be rotated synchronously with each other;

a detecting system for scanning a cloth original wound on the first rotary cylinder to detect the necessary color light in terms of an electric signal;

an enlarging/compressing circuit for converting the time axis of the detected electric signal to enlarge or compress the original in its circumferential direction;

a memory circuit for storing the output signal from the enlarging/compressing circuit;

an expanding/contracting circuit for adjusting the bleed allowance or the overlap allowance capable of generating an output signal expanded or contracted by a given time length based on the input signal to the memory circuit; and a reproducing system for exciting a recording object installed on the second rotary cylinder according to the output signal of the expanding/contracting circuit.

6. A textile printing master making apparatus in accordance with claim 5, wherein two systems of the memory circuit and the expanding/contracting circuit are provided, and wherein output signals corresponding to the electric signal in the scanning direction of the detecting system and to the electric signal in the rotating direction of the rotary cylinders are supplied to the reproducing system.

7. A textile printing master making apparatus comprising:

a first and a second rotary cylinder to be rotated synchronously with each other;

a detecting system for scanning a cloth original wound on the first rotary cylinder to detect the necessary color light in terms of an electric signal;

an enlarging/compressing circuit for converting the time axis of the detected electric signal to enlarge or compress the original in its circumferential direction to adjust the bleed allowance or the overlap allowance; and a reproducing system for giving excitation to a recording object installed on the second rotary cylinder according to the output signal of the enlarging/compressing circuit; wherein at least the original is enlarged or compressed in its circumferential direction by the enlarging/compressing circuit.

8. A printing master making apparatus comprising:

first and second rotary cylinders to be rotated synchronously with each other;

a detecting system for scanning an original wound on the first rotary cylinder and thus detecting the necessary color light in terms of an electric signal;

a memory circuit for storing the detected electric signal;

an expanding/contracting circuit capable of generating an output signal expanded or contracted by a given time length based on the input signal, said circuit having the same time axis as the signal based on the input signal to the memory circuit; and a reproducing system for exciting a recording object installed on the second rotary cylinder according to the output signal of the expanding/contracting circuit so that the bleed allowance or the overlap allowance can be adjusted by the expanding/contracting circuit.

9. A printing master making apparatus in accordance with claim 8 wherein two systems of the memory circuit and the expanding/contracting circuit are provided and wherein output signals corresponding to the electric signal in the scanning direction of the detecting system and to the electric signal in the rotating direction of the rotary cylinder are supplied to the reproducing system.

10. A printing master making apparatus comprising:

first and second rotary cylinders to be rotated synchronously with each other;

a detecting system for scanning an original wound on the first rotary cylinder and thus detecting the necessary color light in terms of an electric signal;

a memory circuit for storing the detected electric signal;

an expanding/contracting circuit capable of generating an output signal expanded or contracted by a given time length based on the input signal, said circuit having the same time axis with the signal based on the input signal to the memory circuit;

an enlarging/compressing circuit for converting the time axis of the output signal of the expanding/contracting circuit; and a reproducing system for exciting a recording object installed on the second rotary cylinder according to the output signal of the enlarging/compressing circuit so that the bleed allowance or the overlap allowance can be adjusted by the expanding/contracting circuit at the same time at least the original is enlarged or compressed in its circumferential direction by the enlarging/compressing circuit.

11. A printing master making apparatus in accordance with claim 10 wherein two systems of the memory circuit and the expanding/contracting circuit are provided and wherein output signals corresponding to the electric signal in the scanning direction of the detecting system and to the electric signal in the rotating direction of the rotary cylinders are supplied to the enlarging/compressing circuit.

12. A printing master making apparatus comprising:

first and second rotary cylinders to be rotated synchronously with each other;

a detecting system for scanning an original wound on the first rotary cylinder and thus detecting the necessary color light in terms of an electric signal;

an enlarging/compressing circuit for converting the time axis of the detected electric signal;

a memory circuit for storing the output signal from the enlarging/compressing circuit;

an expanding/contracting circuit capable of generating an output signal expanded or contracted by a given time length based on the input signal, said circuit having the same time axis as the signal based on the input signal to the memory circuit; and a reproducing system for exciting a recording object installed on the second rotary cylinder according to the output signal of the expanding/contracting circuit so that at least the original is enlarged or compressed in its circumferential direction and at the same time the bleed allowance or the overlap allowance is adjusted by the expanding/contracting circuit.

13. A printing master making apparatus in accordance with claim 12 wherein two systems of the memory circuit and the expanding/contracting circuit are provided and wherein output signals corresponding to the electric signal in the scanning direction of the detecting system and to the electric signal in the rotating direction of the rotary cylinders are supplied to the reproducing system.

* * * * *